United States Patent
Neri et al.

(10) Patent No.: US 10,638,561 B2
(45) Date of Patent: Apr. 28, 2020

(54) ELECTRIC POWER SYSTEMS INCLUDING CENTRALIZED SWITCHED MODE POWER SUPPLIES

(71) Applicant: Astec International Limited, Kowloon (HK)

(72) Inventors: Nathaniel Franco Neri, Taguig (PH); John Faustino Boqueo Begino, III, Pasig (PH); Christopher Alan Jones, Queen Creek, AZ (US); An Kim Nguyen, Brea, CA (US)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/977,306

(22) Filed: May 11, 2018

(65) Prior Publication Data

US 2019/0350054 A1 Nov. 14, 2019

(51) Int. Cl.
*H05B 33/08* (2020.01)
*H02M 1/42* (2007.01)
(Continued)

(52) U.S. Cl.
CPC ......... *H05B 33/0815* (2013.01); *A01G 7/045* (2013.01); *H02M 1/4258* (2013.01);
(Continued)

(58) Field of Classification Search
CPC ............ H05B 33/0815; H05B 33/0833; H05B 33/0845; H05B 37/0245; H05B 37/0272; H05B 37/029
(Continued)

(56) References Cited

U.S. PATENT DOCUMENTS 9,131,581 B1 * 9/2015 Hsia ................... H05B 33/0815
9,320,093 B2 4/2016 Tikkanen et al.
(Continued)

FOREIGN PATENT DOCUMENTS

CN 103762712 B 5/2016

OTHER PUBLICATIONS

Centralized Power Supply System; AD Lighting; Mar. 8, 2014; pp. 265-268.

*Primary Examiner* — Tung X Le
(74) *Attorney, Agent, or Firm* — Harness, Dickey & Pierce, P.L.C.

(57) ABSTRACT

An electric power system includes a centralized switched mode power supply (SMPS) and a network bridge. The centralized SMPS includes AC/DC PFC power converters, DC/DC power converters and a control circuit having a communication interface. The control circuit is configured to control power switch(es) of the AC/DC PFC power converters and power switch(es) of the DC/DC power converters. The network bridge is in communication with the communication interface for receiving remote access control commands between a device remote from the centralized SMPS and the control circuit for controlling the power switch(es) of the AC/DC PFC power converters and the power switch(es) of the DC/DC power converters. Other example electric power systems and methods of detecting when at least one of a plurality of LED strings malfunctions in an electric power system are also disclosed.

15 Claims, 11 Drawing Sheets

(51) Int. Cl.
 *A01G 7/04* (2006.01)
 *H05B 37/02* (2006.01)
 *H02M 3/335* (2006.01)

(52) U.S. Cl.
 CPC ...... *H02M 3/33569* (2013.01); *H05B 33/089* (2013.01); *H05B 37/0245* (2013.01)

(58) Field of Classification Search
 USPC .................................................. 315/307, 312
 See application file for complete search history.

(56) References Cited

U.S. PATENT DOCUMENTS

| | | | | |
|---|---|---|---|---|
| 2005/0174473 | A1* | 8/2005 | Morgan | H05B 33/0803 348/370 |
| 2008/0224636 | A1* | 9/2008 | Melanson | H05B 33/0815 315/307 |
| 2012/0280637 | A1* | 11/2012 | Tikkanen | H05B 33/0803 315/294 |
| 2014/0361699 | A1* | 12/2014 | Sullivan | H05B 33/0845 315/200 R |
| 2015/0048758 | A1* | 2/2015 | Carrigan | H05B 33/0842 315/294 |
| 2015/0054417 | A1* | 2/2015 | Lee | H05B 37/0272 315/201 |
| 2015/0327340 | A1* | 11/2015 | Siessegger | H05B 33/0818 315/200 R |
| 2016/0057824 | A1* | 2/2016 | Hu | H05B 33/0815 315/210 |
| 2017/0202062 | A1* | 7/2017 | Choi | H05B 33/0854 |
| 2017/0245341 | A1* | 8/2017 | Lee | H05B 37/0272 |

* cited by examiner

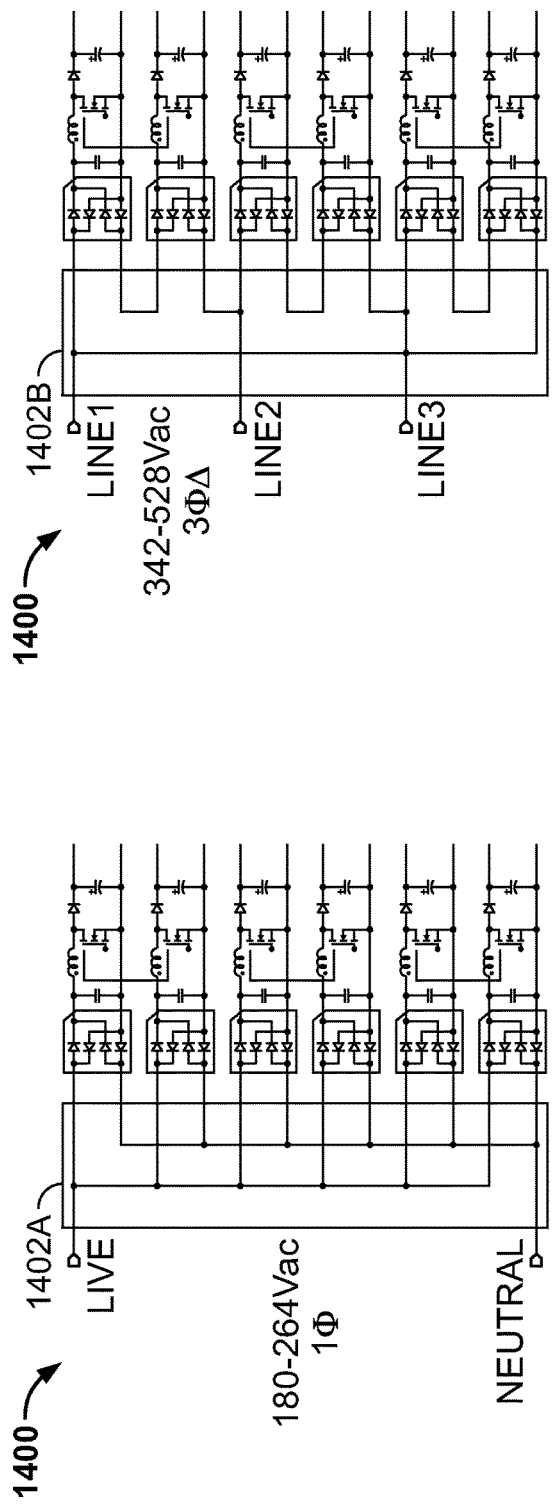
FIG. 14A
FIG. 14B
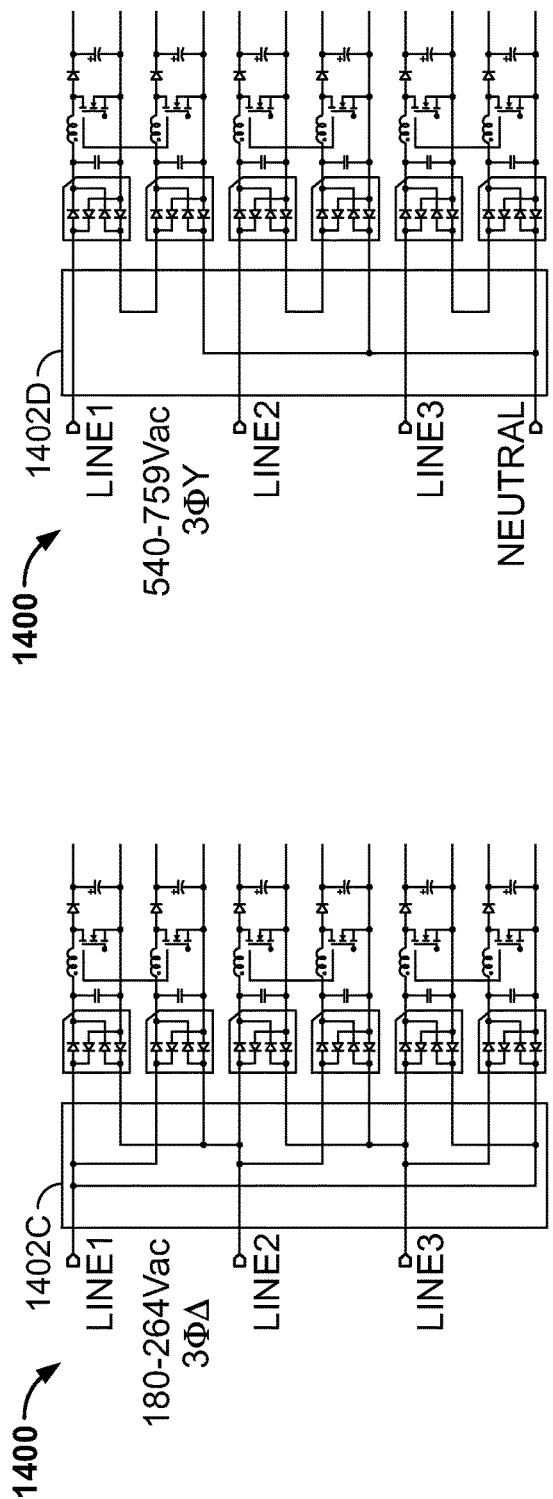
FIG. 14C
FIG. 14D

ELECTRIC POWER SYSTEMS INCLUDING CENTRALIZED SWITCHED MODE POWER SUPPLIES

FIELD

The present disclosure relates to electric power systems including centralized switched mode power supplies.

BACKGROUND

This section provides background information related to the present disclosure which is not necessarily prior art.

Electric power systems commonly include a distributed switched mode power supply (SMPS) or a centralized SMPS for powering one or more loads. When an electric power system includes a centralized SMPS, power switches in the centralized SMPS are commonly controlled with analog control signals.

FIG. 1 illustrates a conventional electric power system 100 including a distributed SMPS 102 for powering multiple LED luminaires 104 located in grow rooms in an indoor horticulture facility. The distributed SMPS 102 includes a main power stage located in a power and control room, LED drivers 106 located in the grow rooms, and a controller 108 for controlling the LED drivers 106 via control feed lines 110. Each LED driver 106 receives AC or DC power from the main power stage via power distribution lines 112 and converts the received power to a desired level for powering one of the LED luminaires 104. Alternatively, independent controllers may be located in the grow rooms for controlling the LED drivers 106.

SUMMARY

This section provides a general summary of the disclosure, and is not a comprehensive disclosure of its full scope or all of its features.

According to one aspect of the present disclosure, an electric power system for powering a plurality of DC loads includes a centralized SMPS and a network bridge. The centralized SMPS includes a plurality of AC/DC PFC power converters each having one or more power switches, a plurality of DC/DC power converters each having one or more power switches and an output for coupling to one or more DC powered loads, and a control circuit having a communication interface. The plurality of DC/DC power converters are coupled to the plurality of AC/DC PFC power converters. The control circuit is configured to control the power switches of the AC/DC PFC power converters and the power switches of the DC/DC power converters. The network bridge is in communication with the communication interface for receiving remote access control commands between a device remote from the centralized switched mode power supply and the control circuit for controlling the power switches of the AC/DC PFC power converters and the power switches of the DC/DC power converters.

According to another aspect of the present disclosure, a method of detecting when at least one of a plurality of LED strings malfunctions in an electric power system is disclosed. The electric power system includes a centralized SMPS having at least one AC/DC PFC power converter and at least one DC/DC power converter coupled between the AC/DC PFC power converter and the plurality of LED strings. The at least one DC/DC power converter includes one or more power switches. The method includes comparing an output current of the DC/DC power converter provided to the plurality of LED strings to an output current setpoint of the DC/DC power converter, and if the output current is less than the output current setpoint signifying at least one of the plurality of LED strings is malfunctioning, controlling the one or more power switches of the DC/DC power converter to reduce the output current of the DC/DC power converter by an amount corresponding to the remaining number of LED strings of the plurality of LED strings.

According to another aspect of the present disclosure, an indoor horticulture facility utilizing one or more LED luminaries for growing plants in one or more grow rooms is disclosed. The indoor horticulture facility includes a centralized switched mode power supply and a network bridge. The centralized switched mode power supply includes a plurality of AC/DC PFC power converters each having one or more power switches, a plurality of DC/DC power converters each having one or more power switches and an output for coupling to one or more LED luminaries, and a control circuit having a communication interface. The plurality of DC/DC power converters are coupled to the plurality of AC/DC PFC power converters. The control circuit is configured to control the power switches of the AC/DC PFC power converters and the power switches of the DC/DC power converters. The network bridge is in communication with the communication interface for receiving remote access control commands between a device remote from the centralized switched mode power supply and the control circuit for controlling the power switches of the AC/DC PFC power converters and the power switches of the DC/DC power converters.

According to another aspect of the present disclosure, an LED display panel includes one or more LED luminaries, a centralized switched mode power supply and a network bridge. The centralized switched mode power supply includes a plurality of AC/DC PFC power converters each having one or more power switches, a plurality of DC/DC power converters each having one or more power switches and an output for coupling to one or more LED luminaries, and a control circuit having a communication interface. The plurality of DC/DC power converters are coupled to the plurality of AC/DC PFC power converters. The control circuit is configured to control the power switches of the AC/DC PFC power converters and the power switches of the DC/DC power converters. The network bridge is in communication with the communication interface for receiving remote access control commands between a device remote from the centralized switched mode power supply and the control circuit for controlling the power switches of the AC/DC PFC power converters and the power switches of the DC/DC power converters.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14A is a circuit diagram of a configuration board receiving a single phase voltage ranging from 180 VAC to 264 VAC, according to yet another example embodiment.

FIG. 14B is a circuit diagram of a configuration board receiving a three phase voltage ranging from 342 VAC to 528 VAC, according to another example embodiment.

FIG. 14C is a circuit diagram of a configuration board receiving a three phase voltage ranging from 180 VAC to 264 VAC, according to yet another example embodiment.

FIG. 14D is a circuit diagram of a configuration board receiving a three phase voltage ranging from 540 VAC to 759 VAC, according to another example embodiment.

Corresponding reference numerals indicate corresponding parts and/or features throughout the several views of the drawings.

DETAILED DESCRIPTION

Figure 1:
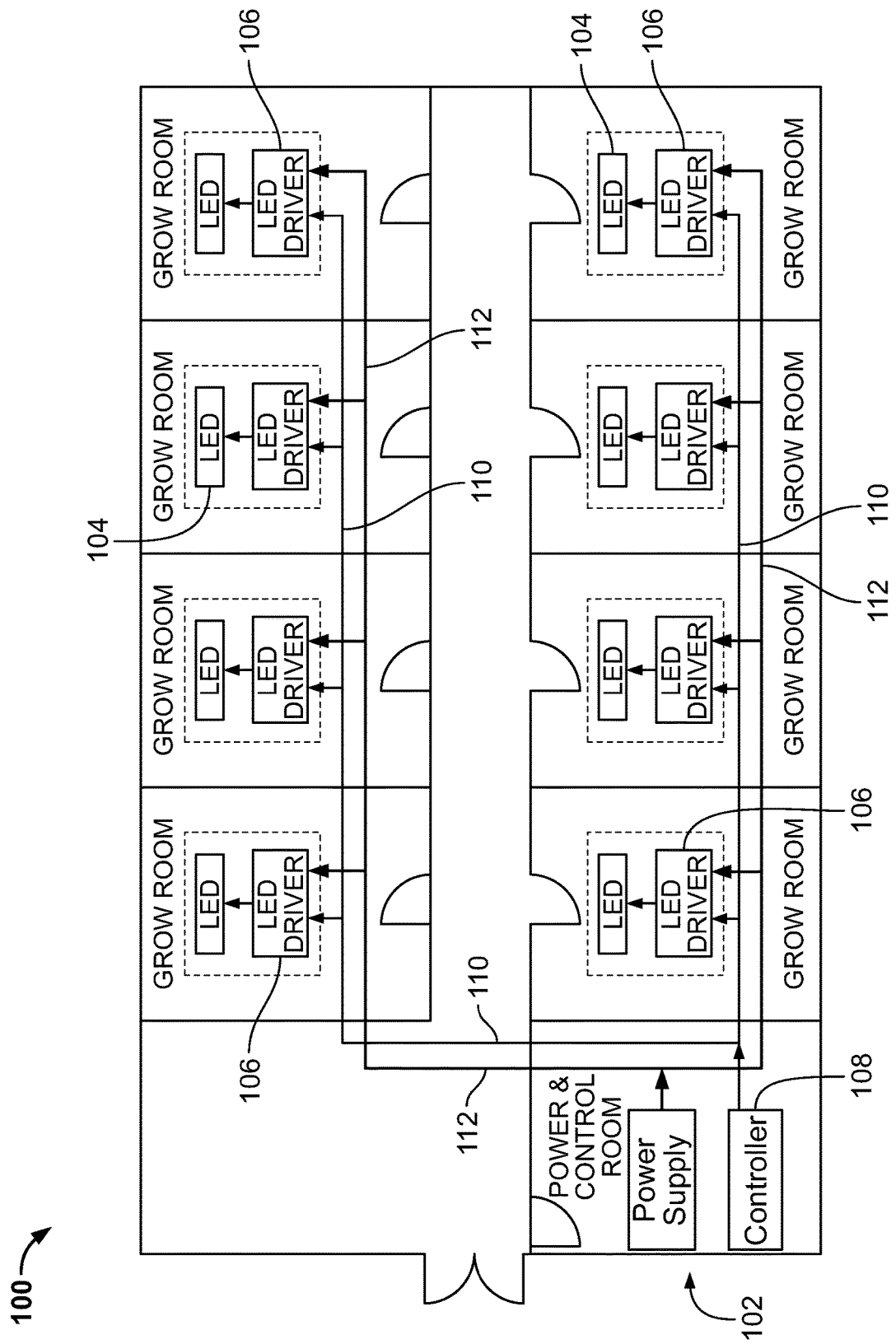
FIG. 1 is a block diagram of a conventional electric power system including a distributed SMPS having remote LED luminaires and LED driver circuitry.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
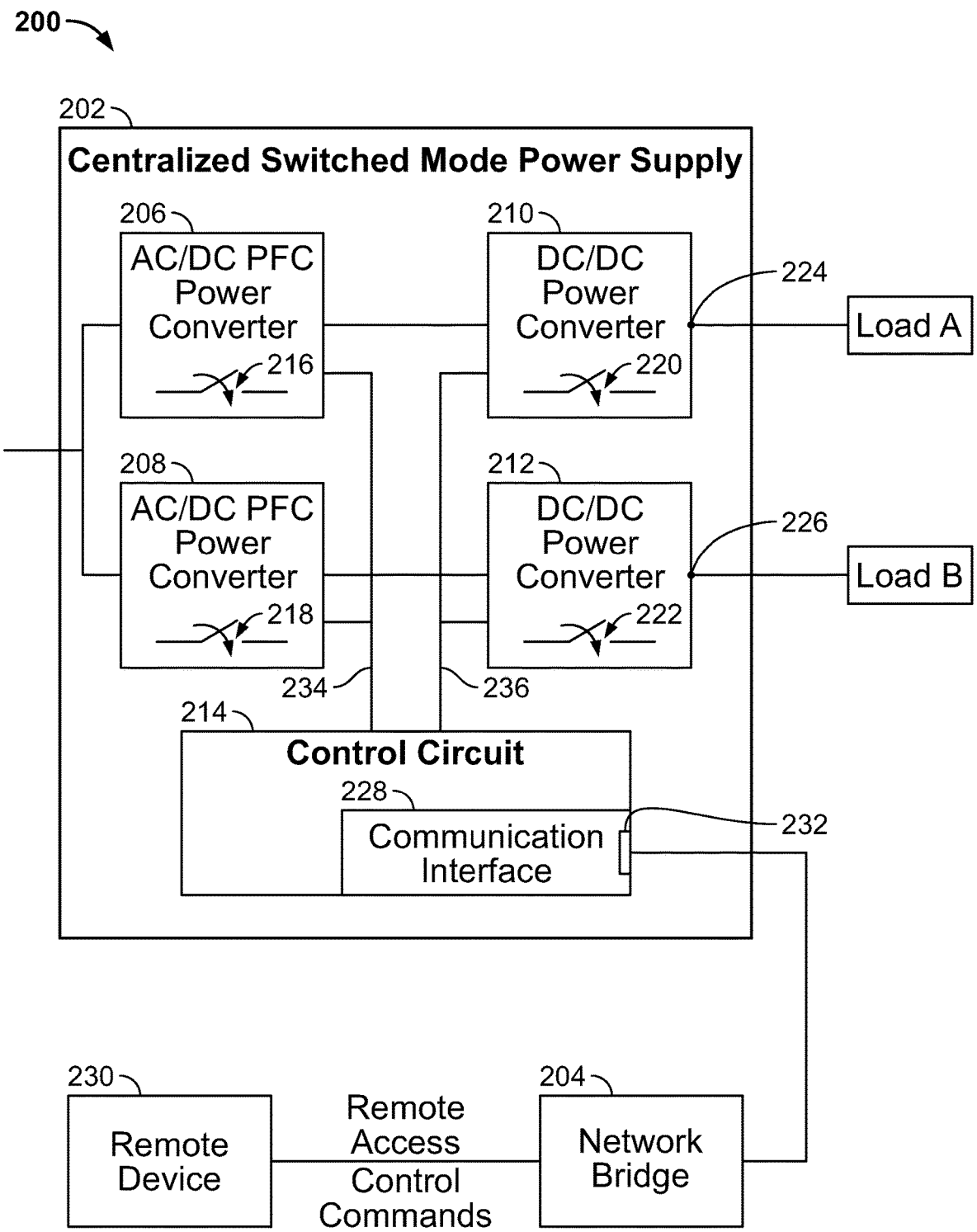
FIG. 2 is a block diagram of an electric power system including a centralized SMPS having remote access control functionality, according to one example embodiment of the present disclosure.

An electric power system for powering a plurality of DC loads according to one example embodiment of the present disclosure is illustrated in FIG. 2 and indicated generally by reference number 200. As shown in FIG. 2, the electric power system 200 includes a centralized switched mode power supply (SMPS) 202 and a network bridge 204. The centralized SMPS 202 includes two AC/DC PFC power converters 206, 208, two DC/DC power converters 210, 212 coupled to the AC/DC PFC power converters 206, 208, and a control circuit 214 including a communication interface 228. The AC/DC PFC power converters 206, 208 each include one or more power switches 216, 218. The DC/DC power converters 210, 212 each include one or more power switches 220, 222 and an output 224, 226 for coupling to DC powered loads A, B. The control circuit 214 controls the power switches 216, 218, 220, 222. As shown in FIG. 2, the network bridge 204 is in communication with the communication interface 228 for receiving remote access control commands between a device 230 remote from the centralized SMPS 202 and the control circuit 214 for controlling the power switches 216, 218, 220, 222.

By employing the centralized SMPS 202, greater control flexibility may be achieved as compared to known distributed power supplies. For example, a distributed power supply includes main power conversion circuitry at one location and secondary power conversion circuitry near or at a load. In such examples, control circuits are required at the load and/or control lines are required between the distributed power supply and the load. However, the SMPS 202 of FIG. 2 is able provide necessary power conversion at one centralized location without requiring further power conversion at the loads A, B. As such, control circuitry is not necessary at the load and control lines are not necessary between the SMPS 202 and the loads A, B. In turn, installation of the power conversion circuitry in the system 200, control of the loads A, B, etc. are simplified as compared to known distributed power supplies.

Additionally, the remote access control commands provided to the centralized SMPS 202 for controlling the power converters 206, 208, 210, 212 enables the SMPS 202 to function as an Internet of Things (IoT) device. For example, the remote access control commands allow the centralized SMPS 202 to communicate with other devices over a network without requiring human-to-human or human-to-computer interaction. Specifically, a remote device is able to remotely access, monitor, control, etc. the SMPS 202 anywhere in the world.

As shown in FIG. 2, the network bridge 204 is coupled between the control circuit 214 and the remote device 230. The network bridge 204 is used to create a communication network of the control network in the centralized SMPS 202 and one or more other networks remote from the SMPS 202. In some examples, the network bridge 204 may include one or more network switches and/or other suitable devices for connecting the control network in the centralized SMPS 202 and one or more other networks remote together.

The network bridge 204 enables the centralized SMPS 202 to receive remote access control commands. For example, the remote device 230 is able to access the control network in the centralized SMPS 202 over the communication network, and provide control commands (via the network bridge 204) for controlling the power converters 206, 208, 210, 212. In addition, the remote device 230 may access the control network, and receive data relating to sensed parameters (e.g., current, voltages, temperatures, etc.) of the power converters 206, 208, 210, 212, possible malfunctions of the power converters 206, 208, 210, 212 and/or the loads A, B, etc.

The remote access control commands may be employed in addition to or instead of local access control commands. For example, the communication interface 228 of the control circuit 214 may receive the remote access control commands and local access control commands. When local access control commands are employed, a device may be connected to the control circuit 214 via a communication port (not shown) in the communication interface 228 without accessing the communication network. In other words, the device accesses the control network directly without passing through the communication network. In doing so, the device can provide local control commands, receive data relating to the power converters 206, 208, 210, 212 and/or the loads A, B, etc. as explained above.

The communication interface 228 is a connection point for communicating data between the control circuit 214 and the remote device 230 (e.g., a remote computing device, etc.) and/or other devices. The communication interface 228 may communicate this data over a wired connection and/or a wireless connection.

In some embodiments, the communication interface 228 may be an isolated communication (ISOCOMM) interface. In such examples, the ISOCOMM interface may parse data, and provide supervisory communication and housekeeping functionality for each of the power converters 206, 208, 210, 212. For example, the communication interface 228 may include a communication board with communication ports (e.g., ground isolated ports) for interfacing with the power converters 206, 208, 210, 212 (e.g., interfacing with controllers co-located with each power converter as explained below), the remote device 230 and/or other devices. For example, these communication ports may interface with the remote device 230 for receiving the remote access control commands (via the network bridge 204), transmitting data relating to the power converters 206, 208, 210, 212 and/or the loads A, B, etc. In the example of FIG. 2, the communication interface 228 includes a communication port 232 for interfacing with the network bridge 204 over a wired connection.

As shown in FIG. 2, the control circuit 214 is in communication with the power converters 206, 208, 210, 212. For example, the control circuit 214 outputs communication control signals 234, 236 for controlling the power switches 216, 218, 220, 222 (e.g., transistors, MOSFETs, etc.) of the power converters 206, 208, 210, 212. In some embodiments, the communication control signals 234, 236 may be provided to the power converters 206, 208, 210, 212 via a serial communication bus such as a controller area network (CAN), an RS485 interface, etc. The communication control signals 234, 236 may be based on received inputs representing parameters of the power converters 206, 208, 210, 212, remote access control commands and/or and local access control commands. The parameters may include sensed input and/or output current and/or voltages of the power converters.

In some embodiments, portions of the control circuit 214 may be associated with one or more of the power converters 206, 208, 210, 212. For example, the control circuit 214 may include one or more controllers (e.g., digital controllers) associated with the power converters 206, 208, 210, 212. In such examples, each power converter 206, 208, 210, 212 may include its own controller (e.g., each controller may be co-located with its respective power converter). The controllers associated with the power converters 206, 208, 210, 212 may be in communication with each other and/or the communication interface 228 via, for example, an internal CAN.

The control circuit 214 of FIG. 2 may be implemented entirely with digital control. In other words, the control circuit 214 may not include analog control circuitry (e.g., D/A converters, etc.) and/or analog signals for controlling the power switches 216, 218, 220, 222 of the power converters 206, 208, 210, 212. In such examples, the communication control signals 234, 236 are digital communication control signals.

As shown in FIG. 2, the power converters 206, 210 and the power converters 208, 212 are electrically isolated from each other. Specifically, the AC/DC PFC power converter 206 and the DC/DC power converter 210 are two isolated power stages for generating power for the load A, and the AC/DC PFC power converter 208 and the DC/DC power converter 212 are two isolated power stages for generating power for the load B. This two stage power conversion configuration may be more efficient than other conventional systems employing three or more power stages.

Figure 3:
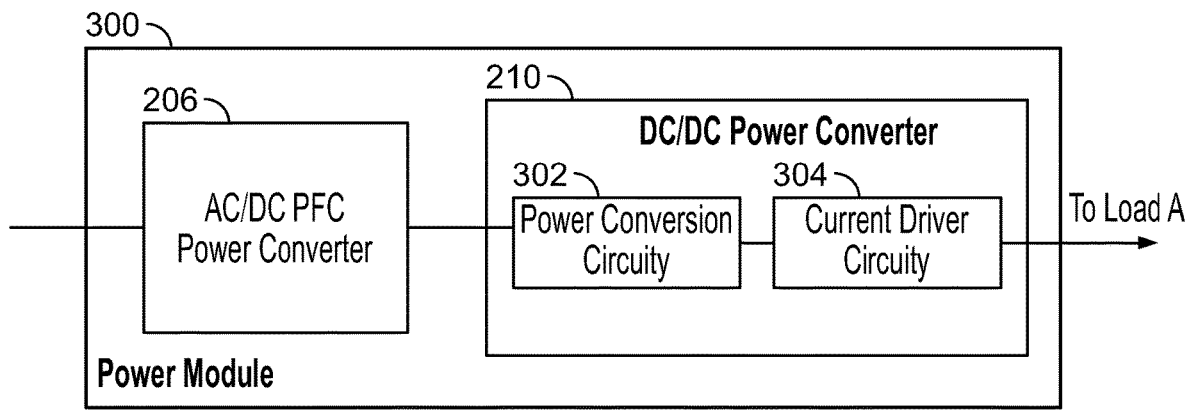
FIG. 3 is a block diagram of an electric power module including an AC/DC PFC power converter and a DC/DC power converter employable in the centralized SMPS of FIG. 2, according to another example embodiment.

In some embodiments, one of the AC/DC PFC power converters 206, 208 and/or one of the DC/DC power converters 210, 212 may be part of an independent and separable power module. For example, FIG. 3 illustrates a portion of the centralized SMPS 202 of FIG. 2 including the AC/DC PFC power converter 206 and the DC/DC power converter 210. As shown in FIG. 3, the AC/DC PFC power converter 206 and the DC/DC power converter 210 are part of a power module 300. The DC/DC power converter 210 includes power conversion circuitry 302 to convert a DC voltage provided by the AC/DC PFC power converter 206 into a regulated DC voltage, and current driver circuitry 304 that functions as a constant current source for powering the load A. In such examples, the DC/DC power converter 210 can operate in a constant current mode.

Figure 4:
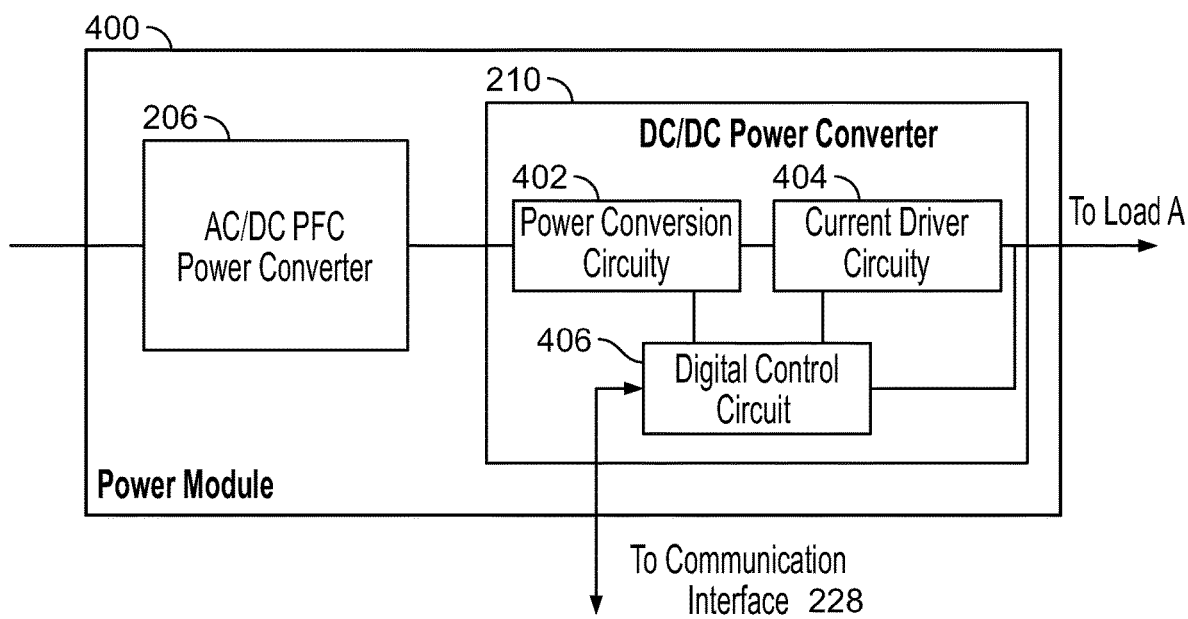
FIG. 4 is a block diagram of an electric power module including an AC/DC PFC power converter, a DC/DC power converter and a control circuit employable in the centralized SMPS of FIG. 2, according to yet another example embodiment.

FIG. 4 illustrates a portion of the centralized SMPS 202 of FIG. 2 including the AC/DC PFC power converter 206 and the DC/DC power converter 210. As shown, the AC/DC PFC power converter 206 and the DC/DC power converter 210 are part of an independent and separable power module 400. In the example of FIG. 4, the DC/DC power converter 210 includes power conversion circuitry 402 and current driver circuitry 404. The power conversion circuitry 402 converts a DC voltage provided by the AC/DC PFC power converter 206 into a regulated DC voltage and current driver circuitry 404 functions as a constant current source (e.g., constant current mode) for powering the load A.

As shown in FIG. 4, a digital control circuit 406 is co-located with the power conversion circuitry 402 and the current driver circuitry 404 in the power module 400. This digital control circuit 406 may be a portion of the control circuit 214 of FIG. 2.

The digital control circuit 406 of FIG. 4 is in communication with the communication interface 228 of FIG. 2, the power conversion circuitry 402 and the current driver circuitry 404. Specifically, the digital control circuit 406 may receive sensed feedback parameters (e.g., an output voltage and/or output current) and an input from the communication interface 228 based on the remote access control commands. These inputs may be used to generate control signals for controlling power switches in the circuitry 402, 404 and/or detect whether the load A is malfunctioning (as further explained below).

Although not shown, the two stage power conversion configuration of the AC/DC PFC power converter 208 and the DC/DC power converter 212 may include the same or different power module arrangements as shown in FIGS. 3 and 4.

Referring back to FIG. 2, the loads A, B may be any suitable DC loads such as LED luminaires including one or more strings of LEDs. For example, FIG. 5 illustrates an electric power system 500 for providing high DC voltage (e.g., 150 VDC, 177 VDC, 250 VDC, 260 VDC etc.) to eight LED luminaires 502 each housed in a different room (e.g. grow room 1, grow room 2, etc.) of an indoor horticulture facility (e.g., vertical farming facility, etc.).

Figure 5:
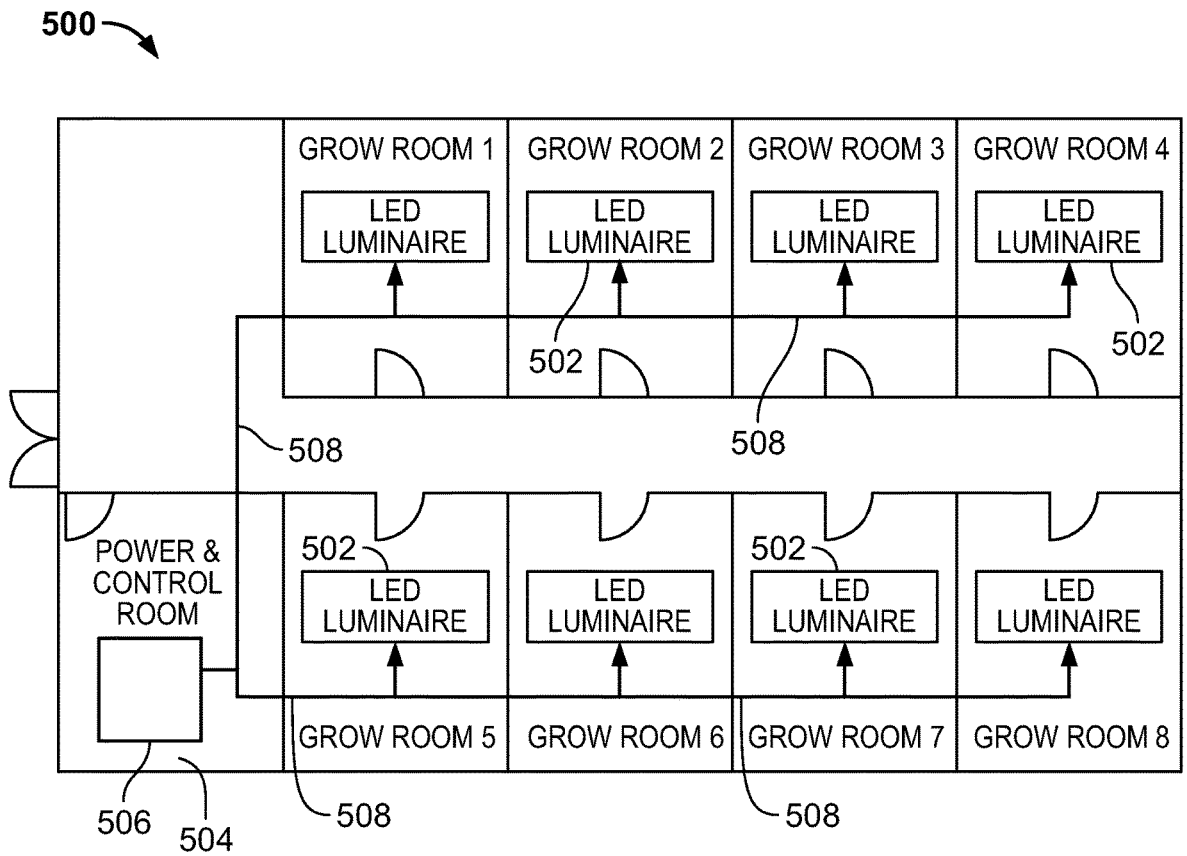
FIG. 5 is a block diagram of an electric power system including a centralized SMPS powering multiple LED luminaires in an indoor horticulture facility based on remote access control commands, according to another example embodiment.

The electric power system 500 of FIG. 5 includes a centralized SMPS 506 housed in a power and control room 504 physically separated from the LED luminaires 502. The centralized SMPS 506 includes a control circuit and multiple AC/DC PFC power converters and DC/DC power converters for powering the eight LED luminaires 502. Each DC/DC power converter includes power conversion circuitry and current driver circuitry (e.g., an LED driver) as explained above. In such examples, each DC/DC power converter has voltage conversion capabilities, electrical isolation (e.g. via a transformer) and LED driver capabilities in the same power stage.

The centralized SMPS 506 receives AC power and provides DC power to a DC distribution bus 508 extending between the SMPS 506 and each LED luminaire 502. For example, the DC distribution bus 508 may include a conductor extending between each DC/DC power converter and its corresponding LED luminaire 502. This enables each DC/DC power converter to output (and adjust) a constant current to its corresponding LED luminaire 502 via the DC distribution bus 508 to control the light intensity of the LED luminaire thereby simulating a daylight profile appropriate for growing specific crops in the indoor horticulture facility. This light intensity may be controlled based on temperature, humidity, time, etc. As a result, higher crop yields and shorter grow times may be achieved.

Figure 6:
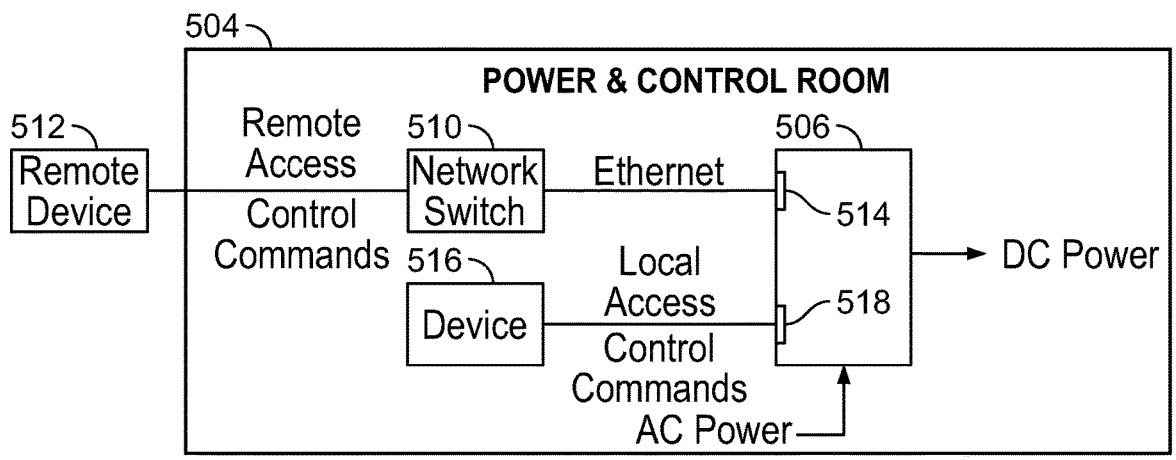
FIG. 6 is a block diagram of a power and control room in the indoor horticulture facility of FIG. 5 for housing the centralized SMPS.

As shown in FIGS. 5 and 6, the control functionality is centralized to the SMPS 506 and contained within the power and control room 504. As a result, the LED luminaires 502 do not include control circuitry and control lines are not distributed to the LED luminaires 502.

As shown in FIG. 6, the electric power system 500 includes a network switch 510 located in the power and control room 504. The network switch 510 is in communication with the control circuit (e.g., via a communication interface) of the SMPS 506 thereby allowing a device 512 remote from the centralized SMPS 506 to access the control circuit over a communication network. This network switch 510 routes remote access control commands from the remote device 512 to the control circuit for controlling the AC/DC PFC power converters and/or the DC/DC power converters, as explained above. In the particular example of FIGS. 5 and 6, the network switch 510 is in communication with the control circuit via an Ethernet connection and a communication port 514. In other examples, the network switch 510 may be in communication with the control circuit with another suitable connection such as a RS-485 serial connection, a controller area network (CAN) bus connection, etc.

The control circuit may also be in communication with another device 516 for providing local access control commands (e.g., not over a communication network), as explained above. For example, the control circuit may include a communication port 518 for coupling to the device 516 via a RS-485 serial connection, a CAN bus connection, an Ethernet connection etc.

Figure 7:
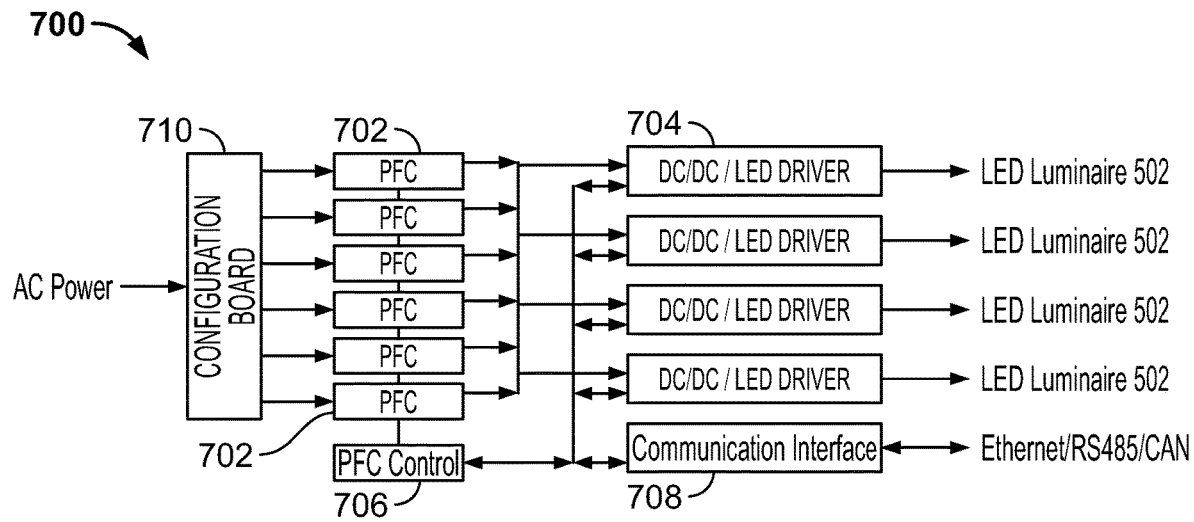
FIG. 7 is a block diagram of an electric power module including six AC/DC PFC power converters and four DC/DC power converters employable in the centralized SMPS of FIG. 5, according to another example embodiment.

In some embodiments, the centralized SMPS 506 may include the same number of AC/DC PFC power converters and DC/DC power converters (e.g., a 1:1 ratio). In other embodiments, the number of AC/DC PFC power converters may be greater than the number of DC/DC power converters. This may allow the centralized SMPS 506 to receive a variation of different input voltage levels and types (e.g. single phase, three phase, etc.). For example, FIG. 7 illustrates a power module 700 that is employable in the centralized SMPS 506 of FIGS. 5 and 6. In such cases, the centralized SMPS 506 may provide a 12 kW output for powering the LED luminaires 502.

The power module 700 includes six AC/DC PFC power converters 702 and four DC/DC power converters 704 each including power conversion circuitry and current driver circuitry (e.g., an LED driver providing constant current). The AC/DC PFC power converters 702 feed a bulk DC voltage to a bus coupling the AC/DC PFC power converters 702 and the DC/DC power converters 704.

The four DC/DC power converters 704 are independent from each. For example, and as shown in FIG. 7, the DC/DC power converters 704 each include an output for supplying DC power to one of the LED luminaires 502. This enables each DC/DC power converter 704 to output (and adjust) a constant current to its corresponding LED luminaire 502 to control the light intensity of the LED luminaire as explained above.

As shown in FIG. 7, the AC/DC PFC power converters 702 and the DC/DC power converters 704 are in communication with a communication interface 708 (e.g., shown as a communication board in FIG. 7). For example, the AC/DC PFC power converters 702 are in communication with the communication interface 708 via a PFC control 706 such as a digital PFC control circuit. Additionally, each DC/DC power converter 704 may include an internal digital control circuit for communicating with the communication interface 708. The communication interface 708 receives remote access control commands and/or local access control commands for controlling the AC/DC PFC power converters 702 and the DC/DC converters 704, and transmits data relating to the AC/DC PFC power converters 702 and/or the DC/DC power converters 704, as explained above. The PFC control 706 and the communication interface 708 may be a portion of the control circuit of FIGS. 5 and 6.

The AC/DC PFC power converters 702 receive AC power (e.g., single phase power, three phase power in a delta or Y configuration, etc.) from a utility grid via a configuration board 710. The configuration board 710 may include one or more interconnecting terminals for configuring the AC input to provide a particular voltage level. The interconnecting terminals in the configuration board 710 may be manipulated to provide an AC voltage ranging between 180 VAC and 759 VAC to the AC/DC PFC power converters 702.

For example, FIGS. 14A-14D each illustrate a configuration board and six PFC power converters 1400 coupled to the configuration board for receiving a range of input voltages. Specifically, FIG. 14A illustrates a configuration board 1402A for receiving a single phase AC voltage ranging from 180 volts to 264 volts. FIGS. 14B and 14C illustrate a configuration board 1402B, 1402C for receiving a three phase AC voltage input having a delta configuration. The three phase AC voltage of FIG. 14B ranges from 342 volts to 528 volts, and the three phase AC voltage of FIG. 14C ranges from 180 volts to 264 volts. FIG. 14D illustrates a configuration board 1402D for receiving a three phase AC voltage input having a Y configuration. The three phase AC voltage of FIG. 14D ranges from 540 volts to 759 volts. Any of the configuration boards shown in FIGS. 14A-14D may be employed as the configuration board 710 of FIG. 7.

Figure 8:
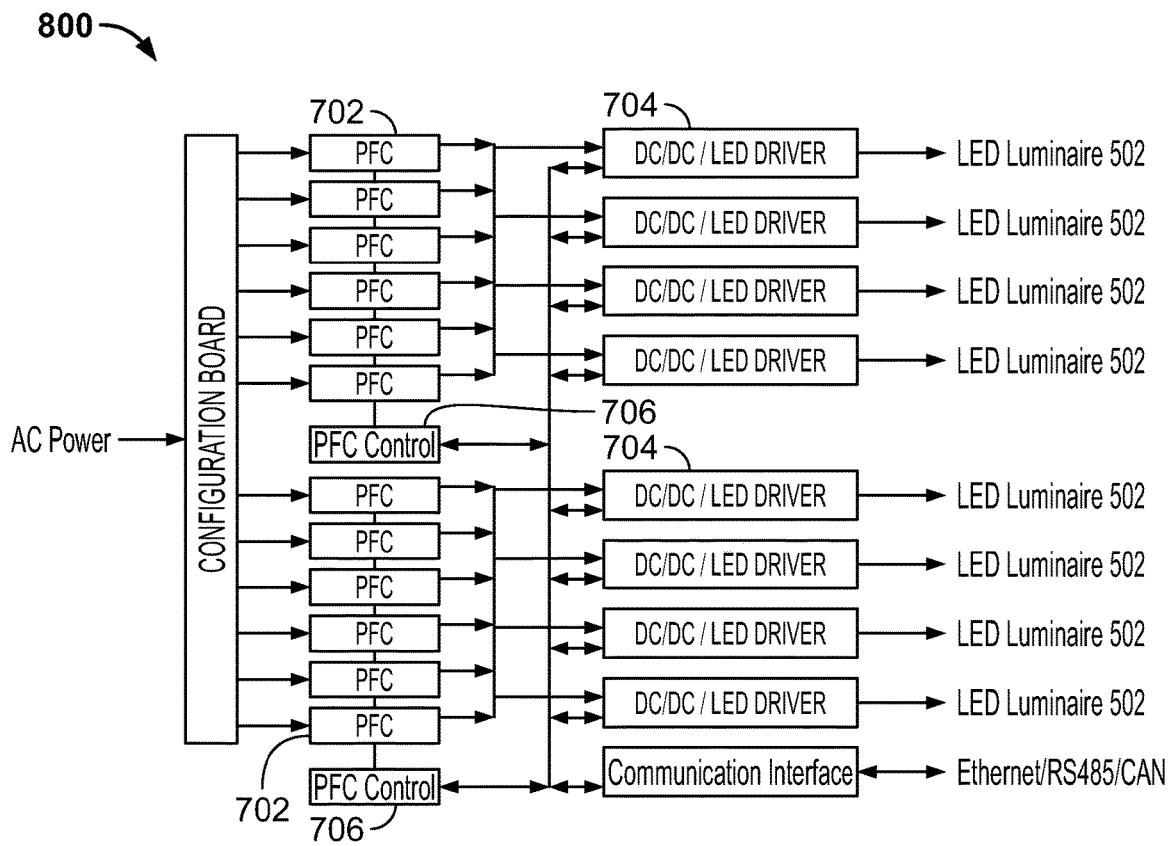
FIG. 8 is a block diagram of an electric power module including twelve AC/DC PFC power converters and eight DC/DC power converters employable in the centralized SMPS of FIG. 5, according to yet another example embodiment.

FIG. 8 illustrates another power module 800 that is employable in the centralized SMPS 506 of FIGS. 5 and 6. In such examples, the centralized SMPS 506 may provide a 24 kW output for powering the LED luminaires 502. The power module 800 is substantially similar to the power module 700 of FIG. 7, but includes twelve AC/DC PFC power converters 702, eight DC/DC power converters 704 and two PFC controls 706.

Figure 9:
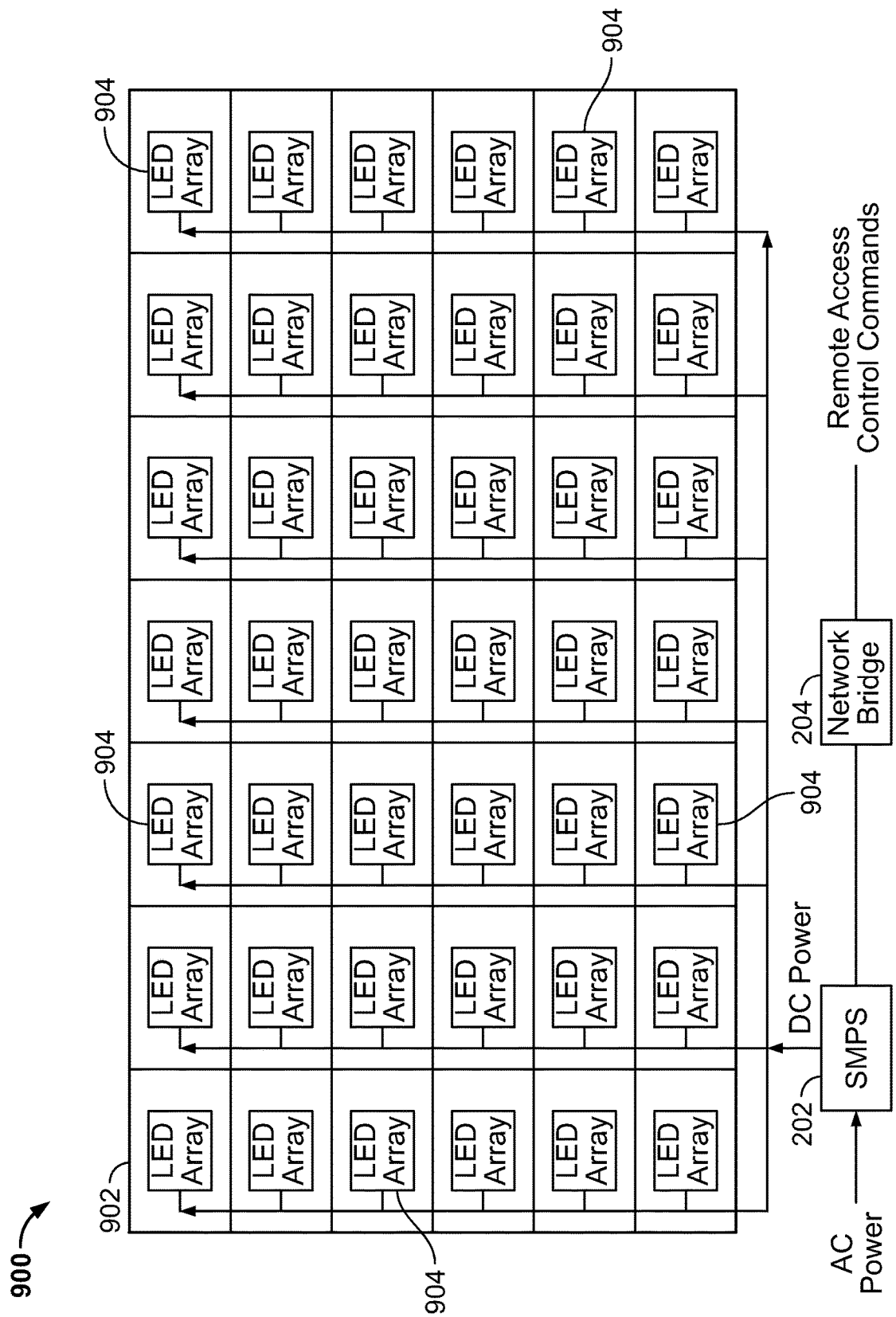
FIG. 9 is a block diagram of an electric power system including a centralized SMPS powering multiple LED arrays in a display panel based on remote access control commands, according to another example embodiment.

FIG. 9 illustrates an electric power system 900 including the network bridge 204 and the centralized SMPS 202 of FIG. 2 for providing high DC voltage to multiple LED arrays 904 on an LED display panel 902. The centralized SMPS 202 may be placed in a room, a housing, etc. that is separated from the multiple LED arrays 904. In the particular example of FIG. 9, the centralized SMPS 202 provides a 24 kW output for powering the LED arrays 904.

As shown in FIG. 9, each LED array 904 is located on a different section of the LED display panel 902 (e.g., billboard, etc.). Each LED array 904 may include one or more strings of LEDs grouped together to form a multiple LED tile. For example, the LED display panel 902 of FIG. 9 may include 6,144 LED tiles (e.g., a 64 by 96 LED tile display panel). This equates to the LED display panel 902 having a 640×576 LED or pixel pattern (i.e., a total of 368,640 LEDs or pixels).

Figure 11:
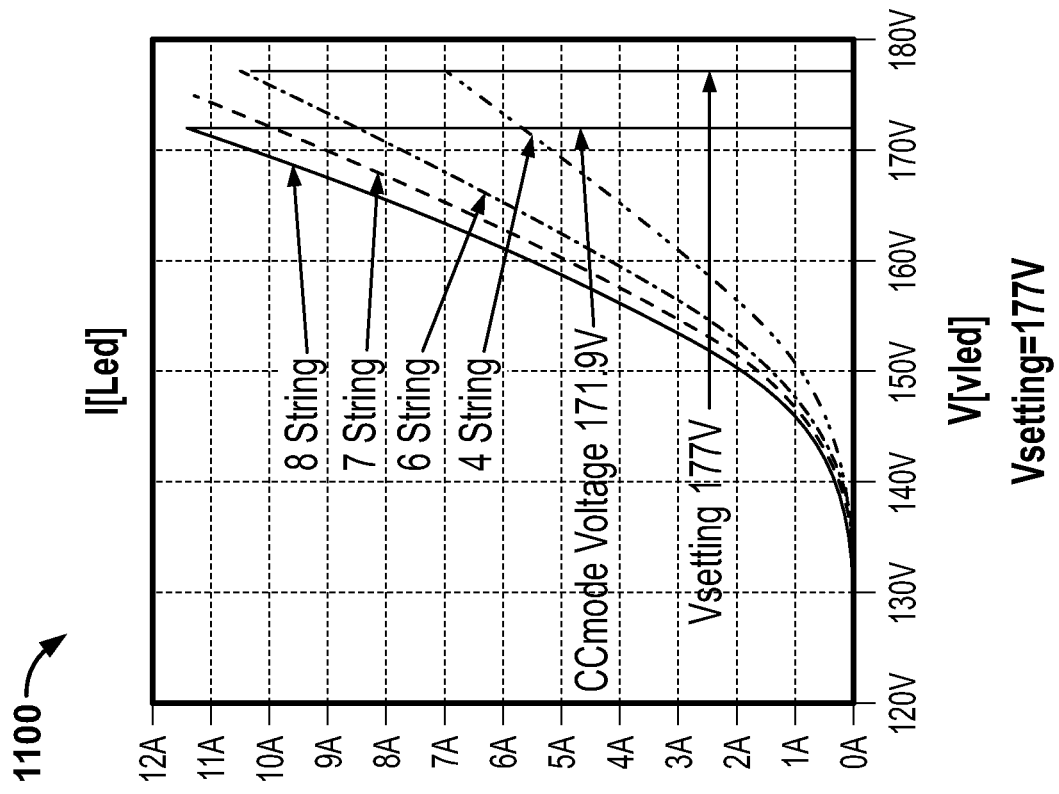
FIG. 11 is a graph of V-I curves for multiple LED strings powered by a DC/DC power converter having an output voltage setpoint of 177 V, according to another example embodiment.
Figure 10:
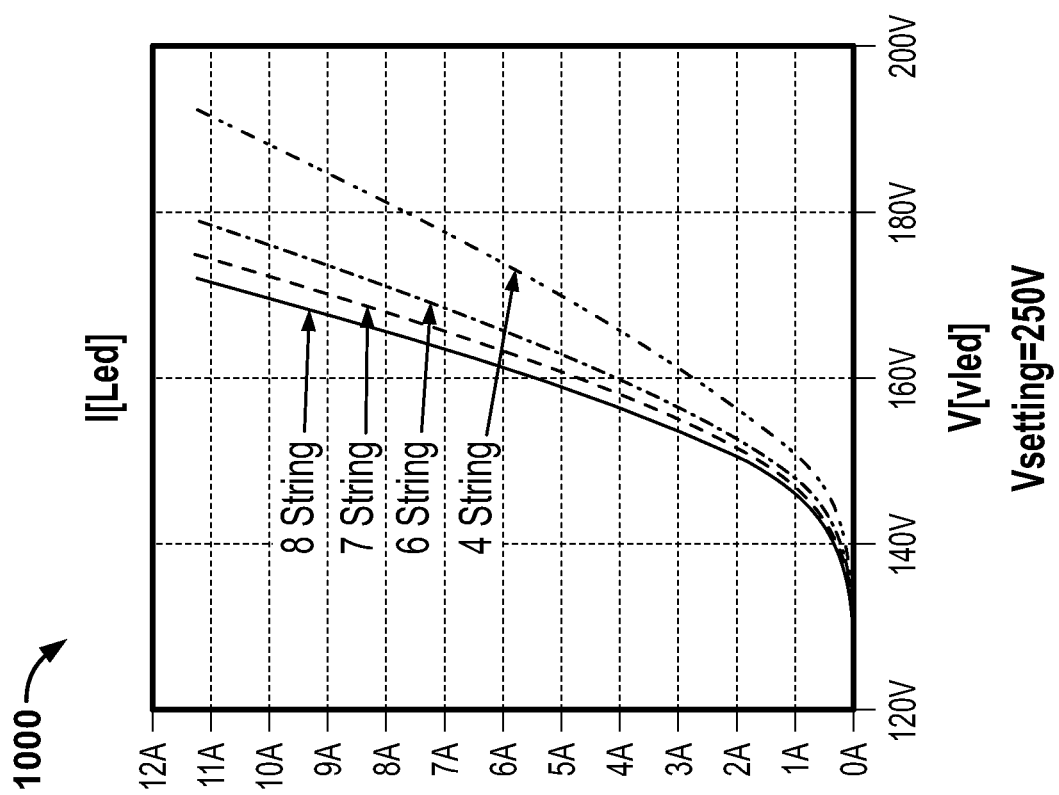
FIG. 10 is a graph of V-I curves for multiple LED strings powered by a DC/DC power converter having an output voltage setpoint of 250 V, according to yet another example embodiment.

In some instances, detection of a malfunctioning load (e.g., a fault condition, open circuit, etc.) may be difficult when the LED drivers are consolidated into a centralized SMPS. For example, FIGS. 10 and 11 illustrate graphs 1000, 1100 showing voltage and current characteristics between a different number of LED strings powered by one AC/DC PFC power converter and DC/DC power converter combination (as explained above). Specifically, the graphs 1000, 1100 show a V-I curve of eight LED strings coupled in parallel, a V-I curve of when seven of the eight LED strings are working properly (e.g., one LED string is malfunctioning), a V-I curve of when six of the eight LED strings are working properly (e.g., two LED string is malfunctioning), and a V-I curve of when four of the eight LED strings are working properly (e.g., four LED string is malfunctioning).

The V-I curves may be used to predict the presence and/or absence of a defined number of LED strings if the DC/DC power converter's output voltage setpoint is not substantially higher than the DC/DC power converter's actual output voltage. This is possible due to the large voltage and current differences in the V-I curves when a different number of LED strings are employed. For example, and as shown in FIG. 10, the DC/DC power converter powering the LED strings has a maximum output voltage setpoint equal to 250 V. In this example, the presence and/or absence of LED strings is not detectable because the resulting terminal voltage across the LED strings does not reach the output voltage setpoint (250 V).

In the graph 1100 of FIG. 11 the DC/DC power converter powering the LED strings has a maximum output voltage setpoint equal to 177 V. When the DC/DC power converter is operated in its constant current mode (as explained above), the DC/DC power converter provides a voltage of 171.9 V and a constant current of 11.2 A to the LED strings. When one of the eight LED strings malfunctions, the output voltage of the DC/DC power converter increases to a value less than the output voltage setpoint (177 V). This allows the DC/DC power converter to continue to provide 11.2 A to the LED strings.

However, when two of the eight LED strings malfunction or four of the eight LED strings malfunction, the output voltage of the DC/DC power converter increases to the maximum value of 177 V. This in turn causes the output current of the DC/DC power converter to inherently reduce to about 10.2 A (when six LED strings are active) and 6.9 A (when four LED strings are active) to protect the remaining active LED strings. As such, a relationship can be formed between the output current of the DC/DC power converter and the number of LED strings powered by that power converter. Therefore, by monitoring the output current of the DC/DC power converter, it is possible predict the number of active LED strings being powered by that DC/DC power converter.

Figure 12:
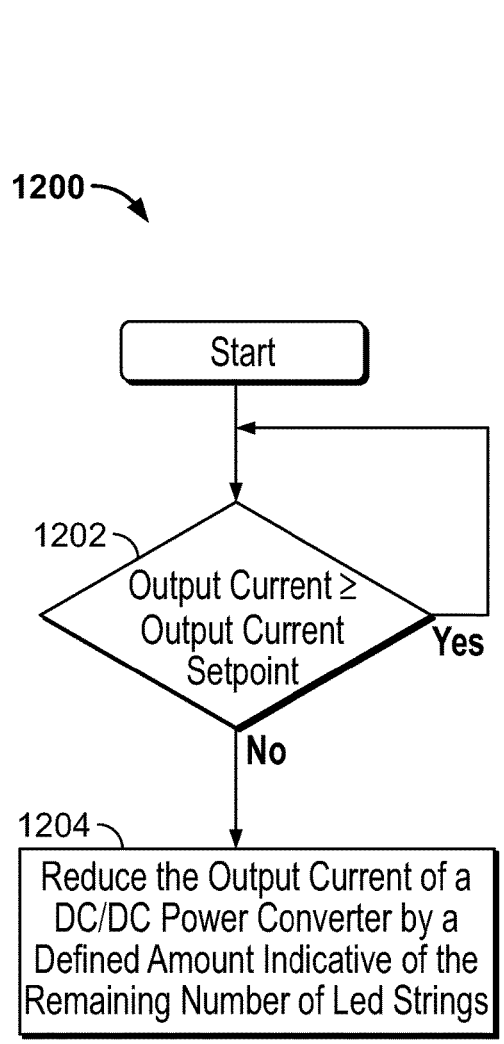
FIG. 12 is a flow chart of a process for detecting when an LED string of a group of LED strings malfunctions and protecting the remaining active LED string from excess current, according to yet another example embodiment.

For example, FIG. 12 illustrates a method 1200 of detecting when at least one LED string of a group of LED strings malfunctions and protecting the remaining active LED string from excess current. The LED strings are coupled in parallel and are powered by an AC/DC PFC power converter and DC/DC power converter combination (as explained above).

As shown in FIG. 12, the method 1200 includes comparing an output current of the DC/DC power converter provided to the LED strings to an output current setpoint of the DC/DC power converter in block 1202. If the output current (e.g., 11.2 A) is greater than or equal to the output current setpoint (e.g., 11.2 A), the method returns to comparing the current and setpoint values in block 1202. When the output current (e.g., 10.2 A) falls below the output current setpoint (e.g., 11.2 A), the method detects that at least one of the LED strings is malfunctioning. In this event, the DC/DC power converter is controlled to reduce its output current by an amount corresponding to the remaining number of active in block 1204.

Figure 13:
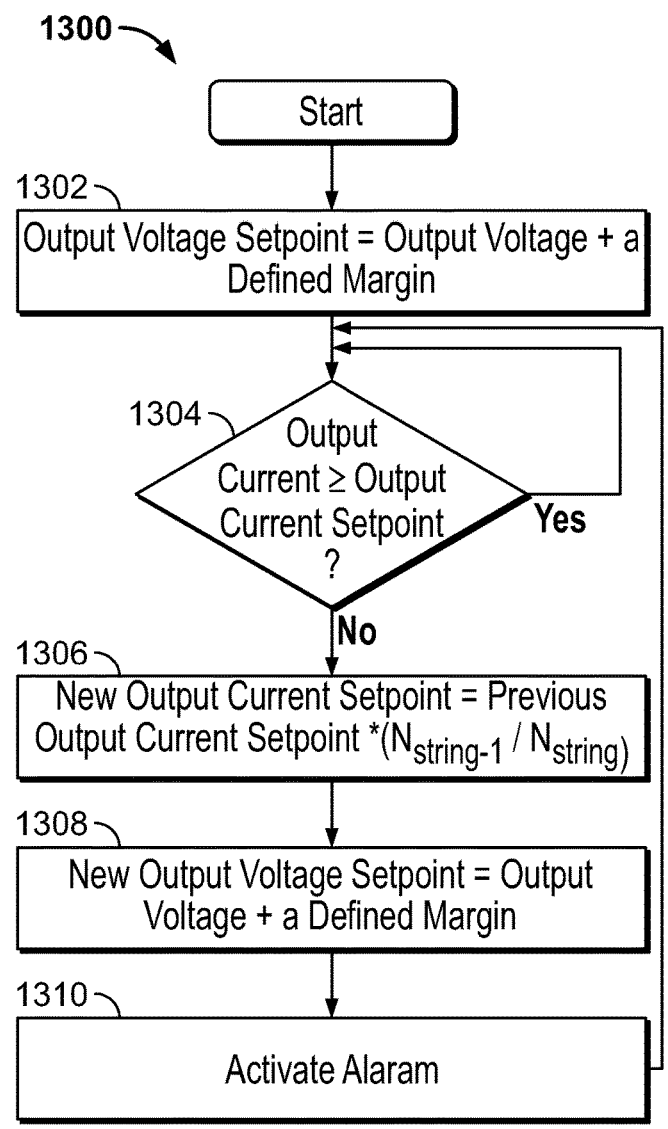
FIG. 13 is a flow chart of a process for detecting when an LED string of a group of LED strings malfunctions and activating an alarm in response to detecting the malfunction, according to another example embodiment.

FIG. 13 illustrates another method 1300 of detecting when at least one LED string of a group of LED strings malfunctions and protecting the remaining active LED string from excess current. As before, the LED strings are coupled in parallel and are powered by an AC/DC PFC power converter and DC/DC power converter combination.

As shown in FIG. 13, the method 1300 including setting an output voltage setpoint of the DC/DC power converter to a value greater than an output voltage of the DC/DC power converter (e.g., the output voltage+a defined margin) in block 1302. For example, the output voltage setpoint may be set to a value just above the sensed output voltage of the DC/DC power converter. As such, the defined margin is generally relatively small. This calibrates the detection and protection process. For instance, the output voltage of the DC/DC power converter may be about 171.9 V when the LED strings are being powered. In such examples, the output voltage setpoint may be set to equal 177 V. In some examples, the output voltage setpoint may be reset (e.g., reduced) from a previous setpoint.

After the output voltage setpoint is set, an output current of the DC/DC power converter is compared to an output current setpoint of the DC/DC power converter in block 1304. If the output current is greater than or equal to the output current setpoint, the method returns to comparing the current and setpoint values in block 1304. If the output current is less than the output current setpoint signifying at least one LED string is malfunctioning (e.g., an LED string is open, etc.), the output current setpoint is reset in block 1306 to reduce the output current of the DC/DC power converter by a defined amount and thereby protect the remaining active LED strings. This new output current setpoint may be equal to the previous output current setpoint multiplied by a ratio of the remaining number of active LED strings and the total number of LED strings as shown in block 1306.

Once the new output current setpoint is set, the output voltage setpoint of the DC/DC power converter is reset in block 1308. This new output voltage setpoint is equal to the current output voltage of the DC/DC power converter plus a defined margin, as explained above relative to block 1302. The current output voltage of the DC/DC power converter is based on the remaining number of active LED strings.

After the new output voltage setpoint is set, an alarm is activated in block 1310 signifying that at least one LED string is malfunctioning in the electric power system. For example, a control circuit in the electric power system may generate and send a signal to a remote device (e.g., a host system) via a network bridge, as explained above. This occurs while the DC/DC power converter continues to provide power to the remaining active LED strings. The generated signal may activate an alarm associated with the remote device.

Figure 15:
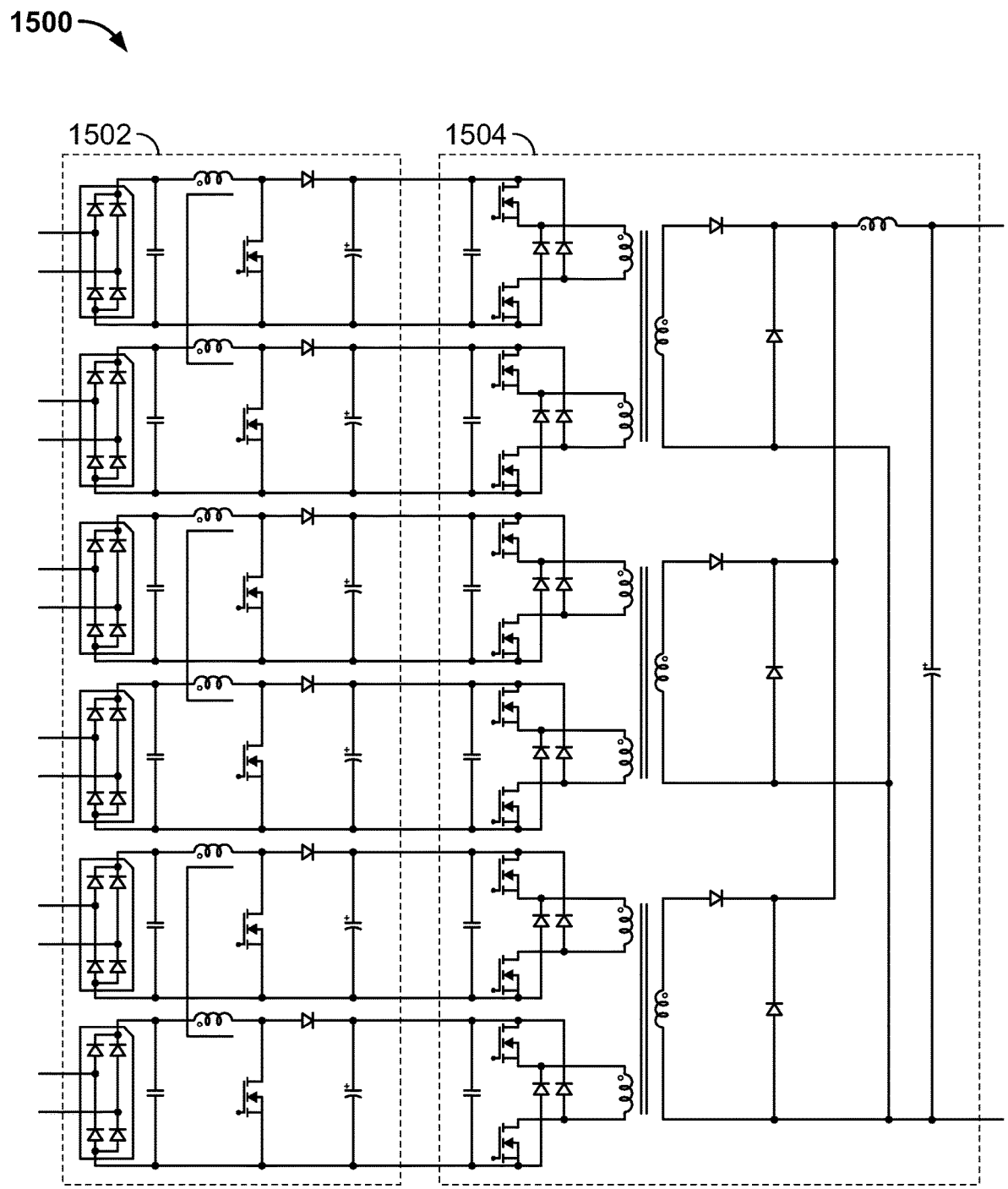
FIG. 15 is a circuit diagram of a portion of a centralized SMPS including six AC/DC PFC power converters each having a boost topology and one DC/DC power converter having an interleave two transistor forward converter topology, according to yet another example embodiment.

The power converters disclosed herein may include any suitable topology. For example, the AC/DC PFC power converters may have boost, buck, flyback, etc. topologies (including their resonant counterparts where applicable), and the DC/DC power converters may have buck, boost, forward, flyback, push-pull, half-bridge, full-bridge, etc. topologies (including their resonant counterparts where applicable). For instance, FIG. 15 illustrates a portion of a SMPS 1500 including six AC/DC PFC power converters (shown in dashed box 1502) each having a boost topology and one DC/DC power converter (shown in dashed box 1504) employing an interleave forward converter topology for supplying a constant current to one load (e.g., a LED luminaire) as explained above. The PFC power converters and the DC/DC power converter of FIG. 15 may be employed as a portion of the PFC power converters and DC/DC power converters of FIGS. 7 and/or 8.

Figure 16:
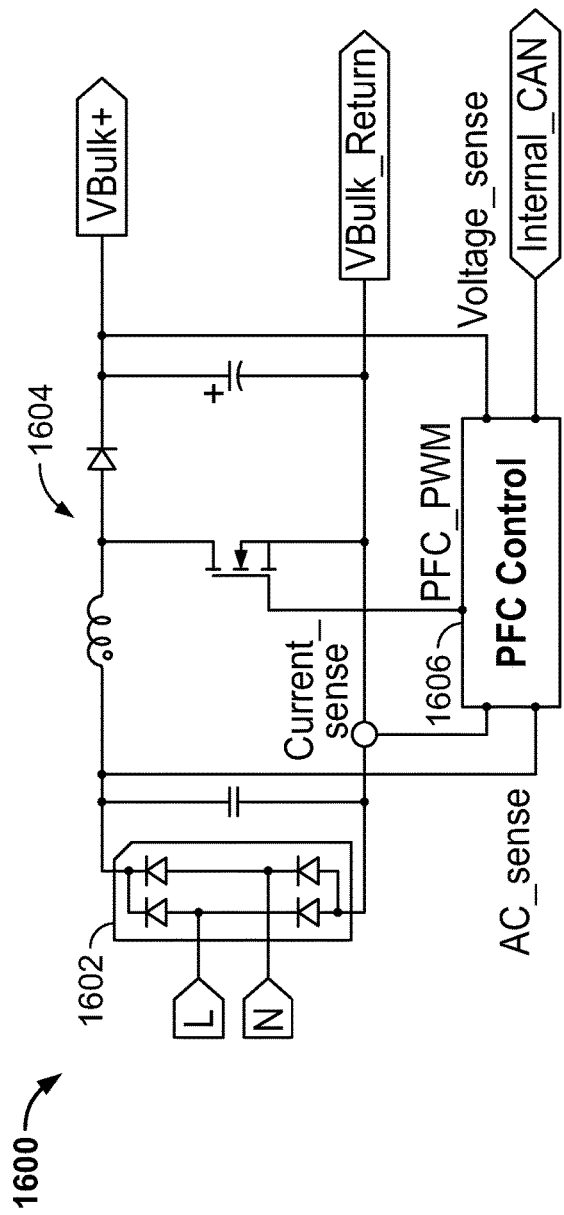
FIG. 16 is a circuit diagram of an AC/DC PFC power converter including a power circuit having a boost topology and a control circuit according to another example embodiment.

As explained above, each power converter of a SMPS may include a control circuit such as a digital controller. In such examples, the control circuits may be part of a system control circuit for the SMPS. For example, FIG. 16 illustrates an AC/DC PFC power converter 1600 including a diode bridge rectifier 1602, a PFC power circuit 1604 having a boost topology, and a PFC control 1606. As shown, the PFC control 1606 is in communication with a communication interface of a system control circuit via an internal_CAN communication signal (e.g., a digital signal). As such, the PFC control 1606 may receive remote access control commands as explained above. The PFC control 1606 receives inputs from a sensed AC rectified input voltage (AC_Sense), a sensed input current (Current_Sense), an output voltage (Voltage_Sense) provided to at least one DC/DC power converter, and/or the communication interface, and generates a control signal (PFC_PWM) for controlling a power switch in the PFC power circuit 1604 based on one or more of the received inputs.

Figure 17:
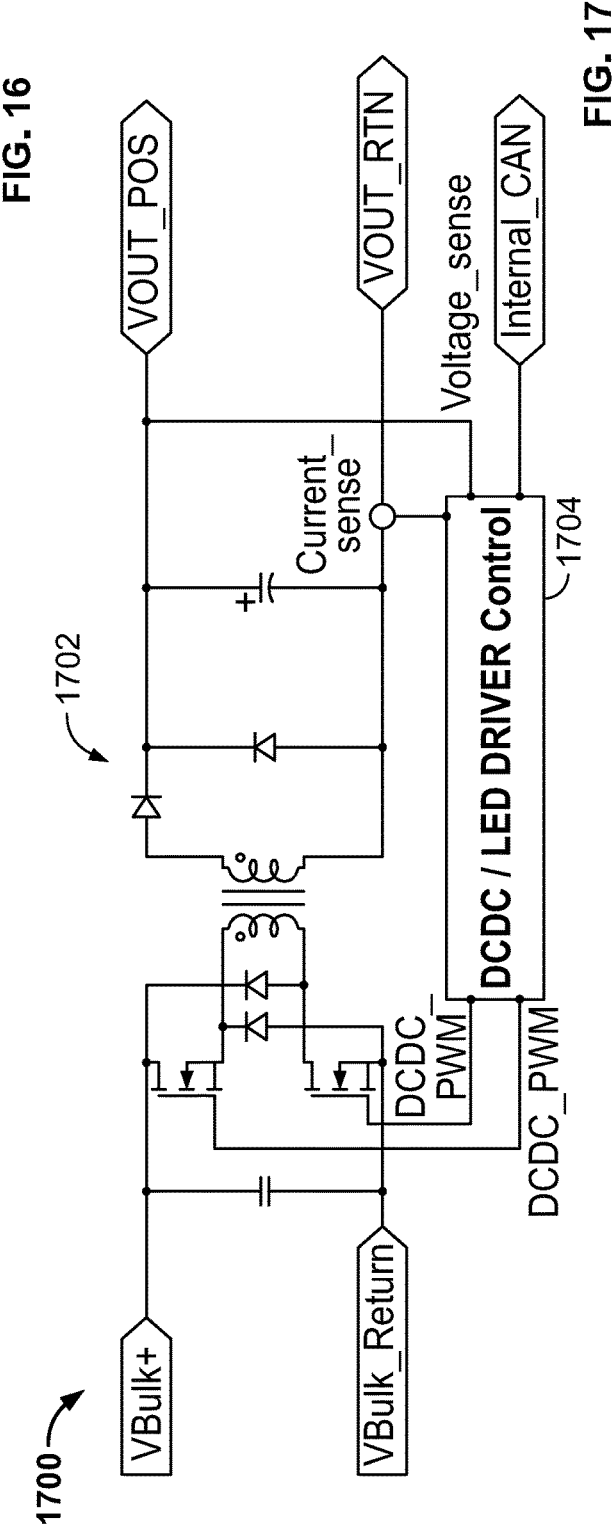
FIG. 17 is a circuit diagram of a DC/DC power converter including a power circuit having a forward converter topology and a control circuit according to yet another example embodiment.

FIG. 17 illustrates a DC/DC power converter 1700 including a power circuit 1702 with a forward converter topology and a DC/DC LED driver control 1704 for controlling the power circuit 1702 to provide a constant current. As shown, the control 1704 is in communication with a communication interface of a system control circuit via an internal_CAN communication signal (e.g., a digital signal). This allows the control 1704 to receive remote access control commands as explained above. The control 1704 receives inputs from a sensed output current (Current_Sense), an output voltage (Voltage_Sense), and/or the communication interface, and generates control signals (DCDC_PWM) for controlling power switches in the power circuit 1702 based on one or more of the received inputs.

By employing any one of the centralized switched mode power supplies disclosed herein, installation, maintenance and control of LED loads in different system applications (e.g., horticulture facilities, LED display panels, etc.) may be improved as compared to conventional distributed switched mode power supplies. For example, the centralized switched mode power supplies include all necessary control components and power conversion components in a central location remote from the LED loads thereby allowing for more convenient installation, maintenance, etc. of the power supplies as compared to conventional switched mode power supplies.

In some instances, component reliability in the centralized switched mode power supplies employed in horticulture facilities may be improved as compared to conventional distributed switched mode power supplies. This is due to placing control and power conversion circuitry outside of growing rooms. As a result, the adverse effects of humidity and water, dust, etc. ingress present in the growing rooms are not realized by the centralized switched mode power supplies.

Additionally, the centralized switched mode power supplies permits IoT functionality. This enables other devices to remotely access the centralized switched mode power supplies for control purposes, data gathering, system monitoring, etc. These capabilities may be achieved over a network without requiring human-to-human or human-to-computer interaction thereby improving productivity as compared to conventional power supplies in LED applications.

Further, the centralized switched mode power supplies may reduce temperatures in areas where the LED loads are located (e.g., in grow rooms, etc.). This is because the LED loads do not include heat generating power conversion circuitry. As a result, less cooling systems (and associated costs) are required to maintain acceptable temperatures in the areas where the LED loads are located as compared to conventional power supplies in LED applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An indoor horticulture facility comprising:
a first plurality of LED luminaires disposed in a grow room in the indoor horticulture facility, the first plurality of LED luminaires configured to provide light to at least one plant in the grow room;
a second plurality of LED luminaires disposed in another grow room in the indoor horticulture facility, the second plurality of LED luminaires configured to provide light to at least one plant in the other grow room;
a centralized switched mode power supply including a plurality of AC/DC PFC power converters each having one or more power switches, a plurality of DC/DC power converters coupled to the plurality of AC/DC PFC power converters, the plurality of DC/DC power converters each having one or more power switches and an output, an output of one of the DC/DC power converters coupled to the first plurality of LED luminaires disposed in the grow room, an output of another one of the DC/DC power converters coupled to the second plurality of LED luminaires disposed in the other grow room, and a control circuit for controlling the power switches of the AC/DC PFC power converters and the power switches of the DC/DC power converters to provide at least 150 VDC to the first plurality of LED luminaires and the second plurality of LED luminaires, the control circuit including a communication interface; and
a network bridge in communication with the communication interface for providing remote access control commands received from a device remote from the centralized switched mode power supply to the control circuit for controlling the power switches of the AC/DC PFC power converters and the power switches of the DC/DC power converters.

2. The indoor horticulture facility of claim 1 further comprising a DC distribution bus coupling the output of said one of the DC/DC power converters and the first plurality of LED luminaires, and the output of said another one of the DC/DC power converters and the second plurality of LED luminaires.

3. The indoor horticulture facility of claim 1 wherein the first plurality of LED luminaires includes a plurality of LED strings.

4. The indoor horticulture facility of claim 3 wherein the control circuit is configured to monitor an output parameter of said one of the DC/DC power converters and detect when one of the plurality of LED strings malfunctions based on the monitored parameter.

5. The indoor horticulture facility of claim 1 wherein each DC/DC power converter of the plurality of DC/DC power converters includes a voltage conversion stage circuitry and current driver circuitry, and wherein the control circuit includes at least one control circuit associated with said each DC/DC power converter.

6. The indoor horticulture facility of claim 1 wherein the plurality of DC/DC power converters are operated in a constant current mode.

7. The indoor horticulture facility of claim 1 wherein the number of AC/DC PFC power converters is greater than the number of DC/DC power converters.

8. The indoor horticulture facility of claim 1 wherein the communication interface includes at least one communication port for communicating with a device providing local access control commands.

9. The indoor horticulture facility of claim 1 wherein the centralized switched mode power supply does not include analog control circuitry.

10. The indoor horticulture facility of claim 1 wherein the centralized switched mode power supply is disposed in a power room distinct from the one or more grow rooms.

11. A method of detecting when at least one of a plurality of LED strings malfunctions in an electric power system including a centralized switched mode power supply having at least one AC/DC PFC power converter and at least one DC/DC power converter coupled between the AC/DC PFC power converter and the plurality of LED strings, the at least one DC/DC power converter including one or more power switches, the method comprising:

comparing an output current of the DC/DC power converter coupled to the plurality of LED strings to an output current setpoint of the DC/DC power converter; and if the output current is less than the output current setpoint signifying at least one of the plurality of LED strings is malfunctioning, controlling the one or more power switches of the DC/DC power converter to reduce the output current of the DC/DC power converter by an amount corresponding to the remaining number of LED strings of the plurality of LED strings.

12. The method of claim 11 further comprising setting an output voltage setpoint of the DC/DC power converter to a value greater than an output voltage of the DC/DC power converter prior to comparing the output current of the DC/DC power converter to the output current setpoint.

13. The method of claim 12 further comprising resetting the output voltage setpoint of the at least one DC/DC power converter based on the remaining number of LED strings of the plurality of LED strings after the output current of the DC/DC power converter is reduced.

14. The method of claim 11 further comprising activating an alarm signifying at least one of the plurality of LED strings is malfunctioning.

15. The method of claim 11 wherein the amount of output current reduction is based on the output current setpoint and a ratio of the remaining number of LED strings and the plurality of LED strings.

* * * * *